US008850083B2

(12) United States Patent
Raichle et al.

(10) Patent No.: US 8,850,083 B2
(45) Date of Patent: Sep. 30, 2014

(54) DATA MANAGEMENT METHOD AND SYSTEM

(75) Inventors: Kurt Raichle, Owatonna, MN (US); Scott Krampitz, Blooming Prairie, MN (US); Garret Miller, Owatonna, MN (US)

(73) Assignee: Bosch Automotive Service Solutions, LLC, Warren, MI (US)

( * ) Notice: Subject to any disclaimer, the term of this patent is extended or adjusted under 35 U.S.C. 154(b) by 729 days.

(21) Appl. No.: 11/492,758

(22) Filed: Jul. 26, 2006

(65) Prior Publication Data

US 2008/0126598 A1 May 29, 2008

(51) Int. Cl.
*G06F 3/00* (2006.01)
*G06F 7/00* (2006.01)

(52) U.S. Cl.
USPC ............................................ 710/20; 701/33

(58) Field of Classification Search
USPC ............................................ 710/20; 701/33
See application file for complete search history.

(56) References Cited

U.S. PATENT DOCUMENTS

| | | | | |
|---|---|---|---|---|
| 4,602,127 | A | 7/1986 | Neely et al. | |
| 5,928,292 | A * | 7/1999 | Miller et al. | 701/1 |
| 5,956,658 | A * | 9/1999 | McMahon | 702/83 |
| 6,247,348 | B1 * | 6/2001 | Yamakado et al. | 73/11.04 |
| 6,532,811 | B2 * | 3/2003 | Turner et al. | 73/146 |
| 6,636,790 | B1 * | 10/2003 | Lightner et al. | 701/33 |
| 7,050,892 | B1 | 5/2006 | Liebl et al. | |
| 7,092,803 | B2 | 8/2006 | Kapolka et al. | |
| 2003/0014179 | A1 * | 1/2003 | Szukala et al. | 701/114 |
| 2004/0117204 | A1 * | 6/2004 | Mazar et al. | 705/2 |
| 2005/0065678 | A1 | 3/2005 | Smith et al. | |
| 2007/0250232 | A1 | 10/2007 | Dourney, Jr. et al. | |

* cited by examiner

*Primary Examiner* — Titus Wong
(74) *Attorney, Agent, or Firm* — Baker & Hostetler LLP

(57) ABSTRACT

A data management system includes a data gathering device and a host device. The data gathering device is configured to gather data regarding a target object and to transmit the data to the host device. The host device operates on the data to produce an output and transmits the output back to the data gathering device. Subsequent action, including the gathering of further data, may be taken on the target object in response to and upon receipt of the output. The data gathering device and host device may communicate via wire or wirelessly. The host device may also exchange information with a network.

18 Claims, 3 Drawing Sheets

DATA MANAGEMENT METHOD AND SYSTEM

FIELD OF THE INVENTION

The present invention relates generally to the collection and management of data. More particularly, the present invention relates to a system for collecting and managing data from a network of relatively simple data gathering devices.

BACKGROUND OF THE INVENTION

In many industries, it is commonplace to collect data about some target object. For example, in the vehicle service industry, it may be necessary to collect the vehicle identification number and mileage prior to servicing a vehicle. Likewise, during service, it may be necessary to collect diagnostic trouble codes and test result data from the vehicle. Once collected, the data is often analyzed to determine some output—a problem with the vehicle or the steps involved in a particular periodic service visit, for example.

As vehicles become more and more complex, however, the tools necessary for performing these sorts of diagnoses become more and more sophisticated. With increased sophistication come increased cost, size, and power requirements. Especially with regard to increased size and power requirements, the increase in sophistication may lead to an undesirable loss of portability of the data gathering tools. That is, simple data gathering tools often lack the necessary functionality, while data gathering tools providing such functionality may be costly and cumbersome.

Accordingly, it is desirable to provide a data management system that provides the requisite level of data gathering and analysis functionality while retaining a familiar, portable, and user-friendly form factor for the data gathering tools themselves.

SUMMARY OF THE INVENTION

The foregoing needs are met, to a great extent, by the present invention, wherein in one aspect a system is provided that in some embodiments provides sophisticated data gathering and analysis functionality utilizing portable, familiar, and relatively simple data gathering tools.

In accordance with one embodiment of the present invention, a data management system includes a data gathering device and a host device. The data gathering device is configured to gather a data item regarding a target object and to transmit the data item to the host. The host is configured to operate on the data item to produce an output and to return the output to the data gathering device. The data item may be generated by the data gathering device as a result of testing the target object. The data gathering device and the host device may communicate via wire or wireless, and the data gathering device may be hand-portable. The host device may also exchange information with an output device, a network, or both.

In accordance with another aspect of the present invention, a data collection and management method is provided. The method involves gathering a first data item using a test device, transmitting the first data item to a host device, operating on the first data item within the host device to produce an output, and transmitting the output from the host device to the test device. A second data item may be gathered in response to and upon receipt of the output, and the second data item may also be transmitted to the host device for analysis. The test device and the host device may communicate directly or via intermediaries, and may be connected wirelessly or via wire. The method may also include exchanging information between the host device and a network.

In accordance with yet another embodiment of the present invention, a data management system is provided. The data management system includes means for collecting data regarding a target object, means for analyzing the data collected, and means for transmitting information between the collecting means and the analyzing means. The analyzing means is remote from the collecting means. The information transmitted includes, but is not limited to, the data collected from the target object.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
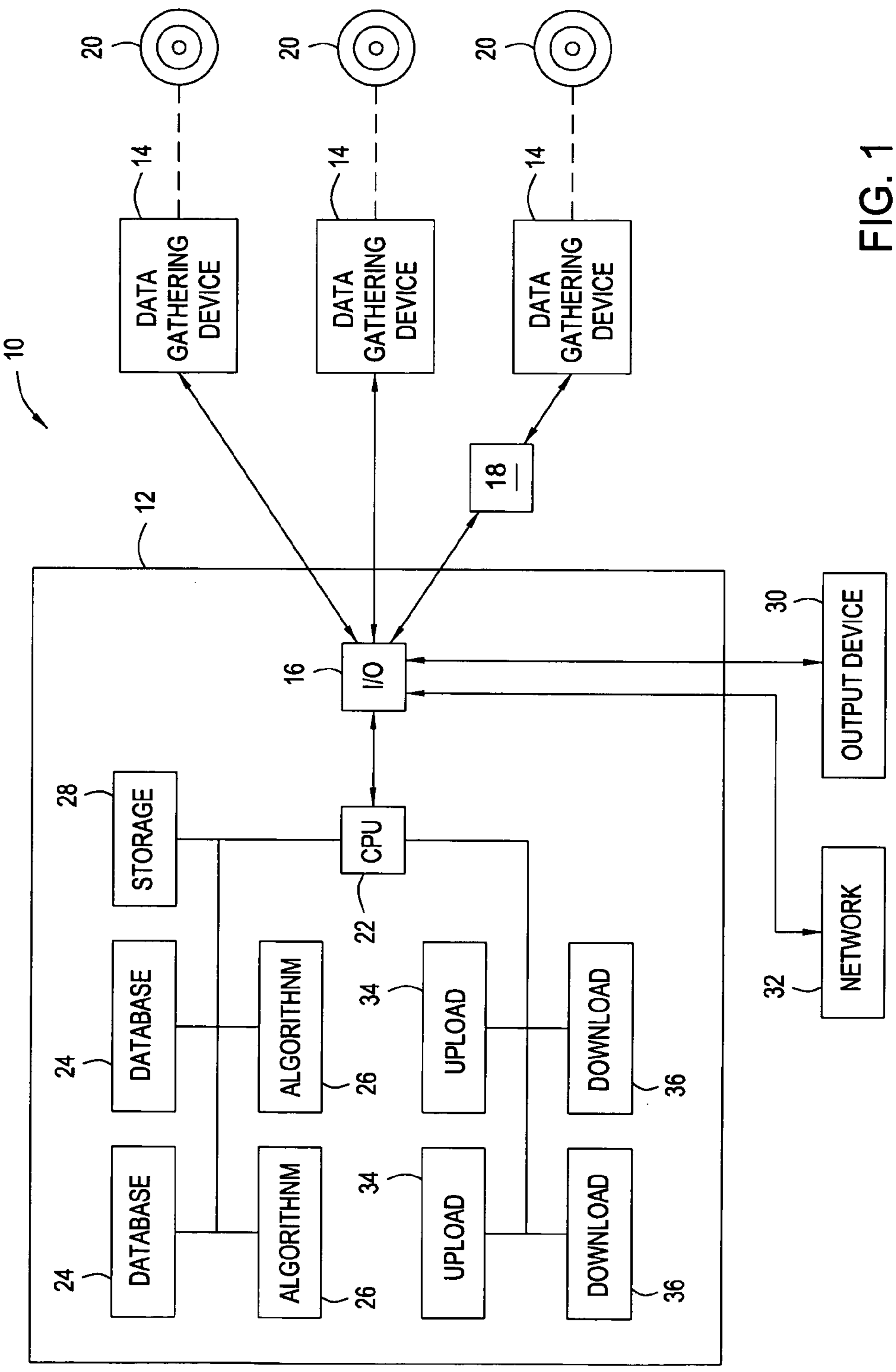
FIG. 1 is a block diagram of a data management system according to one embodiment of the present invention.

The invention will now be described with reference to the drawing figures, in which like reference numerals refer to like parts throughout. An embodiment in accordance with the present invention provides a data management system and method including a data gathering device configured to gather data items regarding a target object and to transmit the data items to a host device configured to operate on the data items, produce outputs, and transmit the outputs to the data gathering device. By separating the host device, which provides the data analysis functionality, from the data gathering device itself, which provides relatively simple on-board data gathering functionality, the data management system of the present invention combines sophisticated data analysis functions with simple, portable, familiar, and user-friendly tools. Thus, it greatly expands the capabilities of common data gathering tools without compromising the portability and simplicity thereof.

A block diagram of an embodiment of a data management system is illustrated in FIG. 1. A data management system 10 generally includes a host device 12 and one or more data gathering devices 14. Data gathering devices 14 are in bi-directional communication with host device 12 via a system input-output 16 incorporated within host device 12.

Data gathering devices 14 may communicate wirelessly with host device 12. Acceptable forms of wireless communication between data gathering devices 14 and host device 12 include, but are not limited to, infrared communication, cellular telephony, Bluetooth communication, Wi-Fi communication, satellite communication, and any other forms of radio communication. A wireless connection between host device 12 and data gathering devices 14 is advantageous, for example, where data gathering devices 14 are to be used at a relatively substantial distance from host device 12. Alternatively, data gathering devices 14 may communicate via wire to host device 12, for example where data gathering devices 14 are to be used in relatively close proximity to host device 12. Any wired communication protocol may be used, including, but not limited to, Ethernet connections (i.e., LAN), Universal Serial Bus (USB) connections, IEEE-1394 (FireWire) connections, optical connections, other serial connections, and parallel connections.

In the embodiment shown in FIG. 1, some data gathering devices 14 are in direct communication with host device 12. However, it should be understood that other data gathering devices 14 may also communicate with host device 12 through one or more intermediaries 18 without departing from the spirit and scope of the present invention. An intermediary 18 may be desirable where the physical distance between host device 12 and data gathering devices 14 is great. For example, where host device 12 and data gathering devices 14 communicate over a Wi-Fi network, it may be desirable to communicate through one or more Wi-Fi access points. Though not necessarily required over relatively short distances, the use of one or more access points not only increases the coverage area of the network over that of a direct, peer-to-peer connection between host device 12 and data gathering devices 14, but also reduces the likelihood of lost communication between host device 12 and data gathering devices 14. Further, for certain communications protocols, an intermediary 18 may be required between host device 12 and data gathering devices 14. For example, where host device 12 and data gathering devices 14 communicate via cellular telephony, existing cellular infrastructure may serve as intermediary 18. Likewise, where host device 12 and data gathering devices 14 communicate via traditional telephony, existing telephone infrastructure may serve as intermediary 18.

Each data gathering device 14 is configured to gather data items from a target object 20 and to transmit these data items to host device 12. To this end, data gathering device 14 may incorporate one or more data gathering interfaces, including, but not limited to, bar code readers, magnetic stripe readers, and smart card readers. In some embodiments of the present invention, data gathering devices 14 may generate data items as the result of a test conducted on target object 20. For example, data gathering device 14 may be a battery tester or other diagnostic tool, such as an On-Board Diagnostics II (OBD-II) scan tool capable of reading diagnostic trouble codes from a vehicle's on-board computer. Data gathering devices 14 may gather data from target object 20 either wirelessly or via wire. To facilitate information exchange with an operator, data gathering devices 14 may include an input device, such as a keypad, keyboard, or touchscreen, and an output device, such as a display.

Data gathering devices 14 may all be identical (for example, a number of OBD-II scan tools used in the service department of an automobile service center), or may represent a variety of different devices (for example, an OBD-II scan tool and a battery tester within a single service bay of the service department). The present invention contemplates the use of data gathering devices 14 lacking sophisticated processing and storage capabilities. That is, the present invention contemplates that data gathering devices 14 are capable of merely gathering data from target object 20 or performing relatively simple, low-level tests on target object 20 to generate data. This facilitates the use of relatively small, hand-portable, inexpensive, and low-power data gathering devices 14, increasing the desirability of such data gathering devices 14 for on-the-spot operations.

Host device 12 enhances and expands the functionality and capabilities of data management system 10 by providing higher-level data processing and higher-capacity storage facilities to data gathering devices 14. In particular, host device 12 operates on data items passed to it by data gathering devices 14 in order to produce an output. In this respect, host device 12 may be regarded as a mainframe for the network of data gathering devices 14. The use of the term "mainframe," however, should not be regarded as limiting host device 12 to a particular implementation, as host device can be implemented in a variety of ways without departing from the scope and spirit of the present invention. This includes not only traditional mainframe computers, but also more familiar and common laptop and desktop personal computers.

Within host device 12, a processor 22 receives data from data gathering devices 14 via system input-output 16 and operates on the data using one or more databases 24 and algorithms 26. The operation performed by processor 22 may depend on many factors, including, but not limited to, the nature of data management system 10, the type of data gathering device 14 transmitting the information, the type of data itself, or some combination thereof. The operations performed may include looking the data up in a database 24 to determine a corresponding output, performing an algorithm 26 using the data to generate a corresponding output, or a combination thereof. The operation may include updating databases 24 to reflect the data received.

In general terms, the result of the operations and analysis by processor 22 is an output. A record of the incoming data, the output, or both may optionally be kept in internal storage module 28, which may be volatile (i.e., RAM) or non-volatile (i.e., magnetic storage). The output is transmitted, again via system input-output 16 and through any intermediaries 18, to data gathering device 14 that sent the original, incoming data. Upon receipt of, and in response to, the output, data gathering device 14 or a user thereof may take subsequent action upon target object 20. For example, the output may indicate to data gathering device 14 that additional data about target object 20 is required. Data gathering device 14 may gather such additional data, such as by performing additional tests thereupon. The data generated by such additional tests may be transmitted to host device 12 and operated upon by processor 22 as described above. Alternatively, the output may be furnished to a user of data gathering device 14, for example by printing it on a display integrated into data gathering device 14, who may take subsequent action upon target object 20. For example, the output may identify a defective part within target object 20 that the user of data gathering device 14 replaces when notified of the defect.

The output may also be transmitted to an output device 30 in communication with host device 12. Output device 30 may include, but is not limited to a printer, a display, a modem, a wireless transmitter, a standalone computer, a networked computer, and an external storage device. Communication between output device 30 and host device 12 may be uni-directional or bi-directional depending upon the nature of output device 30 and any particular requirements of data management system 10.

Host device 12 may also be linked to a network 32, such as a corporate network or the Internet, for purposes of exchanging information, such as uploads 34 and downloads 36, between host device 12 and network 32. For example, host device 12 may upload incoming data or processed outputs to network 32 so that such information may be widely accessed. Similarly, network 32 may push updates to host device 12, which may be system updates (i.e., firmware and software) for one or more of host device 12 and data gathering devices 14. Regarding updates to host device 12, the updates may be new or updated databases 24 or new or updated algorithms 26. Regarding updates to data gathering devices 14, the updates may be operating systems containing new or updated functionality.

Figure 2:
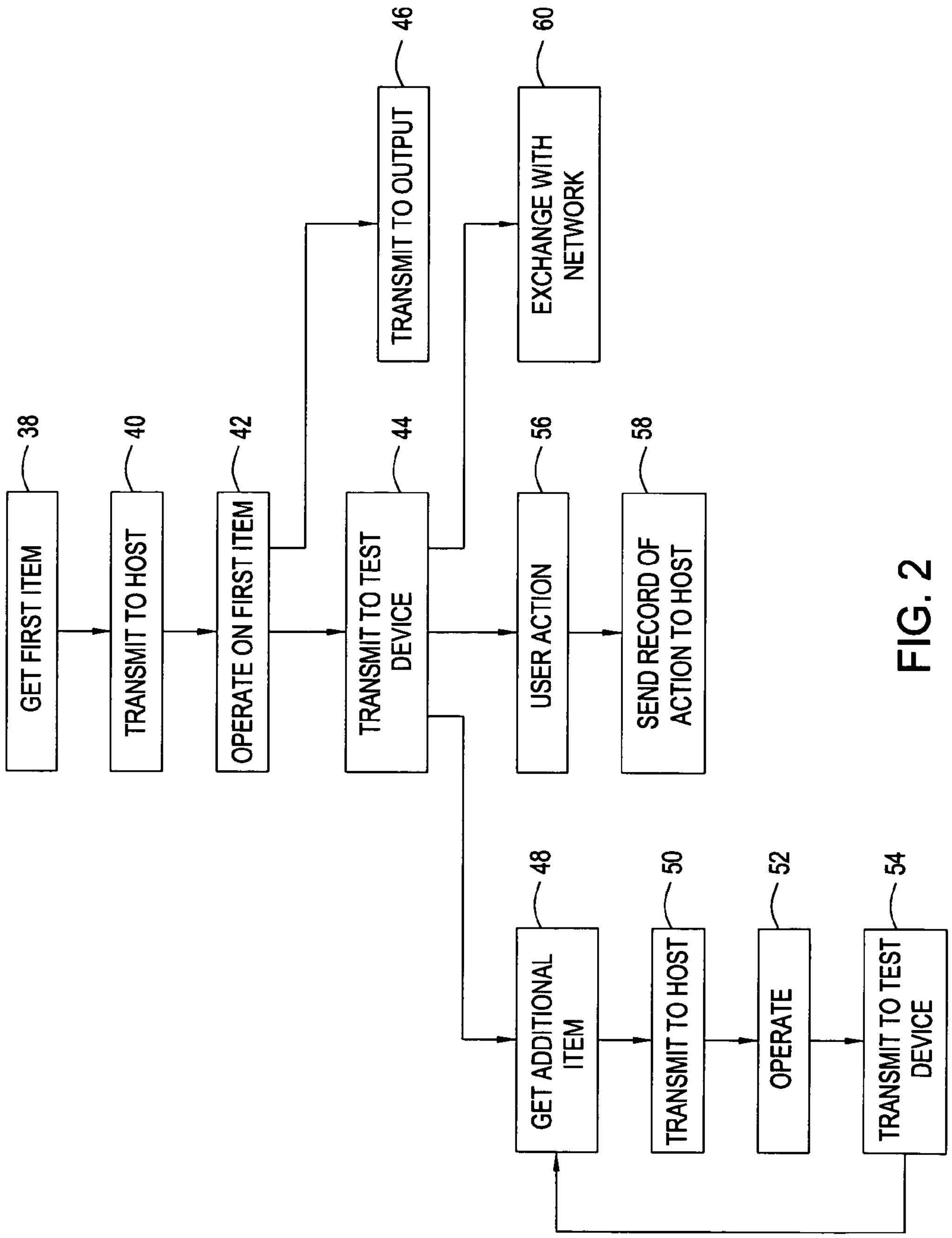
FIG. 2 is a flowchart illustrating one method of data management according to the present invention.

FIG. 2 is a flowchart illustrating a method of data management according to an embodiment of the present invention. In step 38, a data gathering device is used to gather a first data item regarding a target object. This step may involve either reading a data item regarding the target object or performing a test to generate the data item as a test result. The first data item is then transmitted to a host device in step 40. Within the host device, the first data item is operated upon in step 42 to produce an output, which is returned to the data gathering device in step 44. The output may also be sent to an output device in step 46.

Once the output is received at the data gathering device, a number of alternatives are possible. It should be understood that these alternative paths are not mutually exclusive. In one alternative path, step 48 gathers an additional data item in response to the output received and transmits the additional item to the host in step 50. The additional item may be operated upon in step 52 to produce an additional output to be returned to the data gathering device in step 54. This process may be performed recursively, as will be described with reference to an exemplary application of the present invention below. In another alternative path, the user of the data gathering device performs some action in response to the output received in step 56. For example, the user may replace a defective part on the target object. A record of the action taken may be sent to the host device in step 58. The host device may also be connected to a network, and may exchange information therewith in step 60. This information exchange may include furnishing a system update to the host device over the network and installing the system update on one or more of the host device and the data gathering device.

Figure 3:
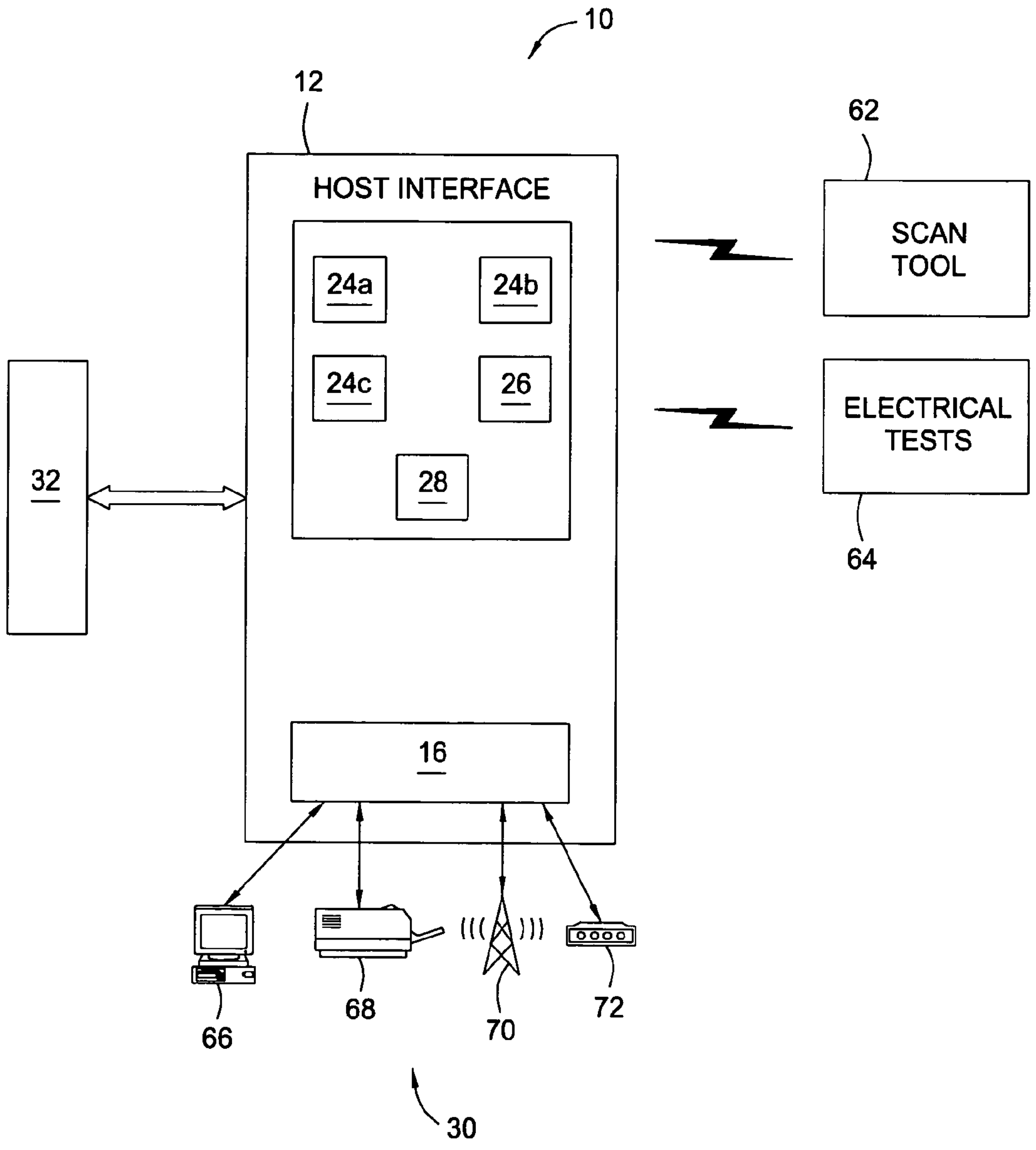
FIG. 3 is a block diagram of a data management system according to the present invention configured for use in a vehicle service environment.

An embodiment of a data management system 10 according to the present invention, configured for use in a vehicle service environment, will be described with reference to FIG. 3. Data management system 10 includes a host device 12 in communication with an OBD-II scan tool 62 and an electrical test tool 64. Electrical test tool 64 may be capable of performing simple battery, alternator, and starter tests on a vehicle being serviced. Host device 12, which is in wireless communication with scan tool 62 and electrical test tool 64, may be conveniently located within a vehicle service center (i.e., in a central office), while scan tool 62 and electrical test tool 64 may be carried about the service center (i.e., from service bay to service bay, or from the interior of the service center to the exterior thereof).

Host device 12 includes a first database 24*a* containing standard OBD-II diagnostic trouble codes (DTCs), one or more databases 24*b* containing manufacturer-specific DTCs, and one or more databases 24*c* containing additional information. It should be clear from the foregoing description that host device 12 (that is, databases 24) may be populated with any information desired or required by a particular application of data management system 10. Thus, information contained in databases 24*c* may include, but is not limited to, parts inventory data, sales incentive data, maintenance manuals, geographic information, technical service bulletins, and technical advice. Host device 12 further includes one or more algorithms 26, such as algorithms to assist a user in identifying probable causes for certain DTCs, again as desired or required by a particular application of data management system 10.

OBD-II scan tool 62 may be attached to the OBD-II port of the vehicle being serviced to read the DTCs stored therein. It may also read generalized vehicle information, such as make, model, and vehicle identification number (VIN), which may be used by host device 12 in identifying parts information and technical service bulletins (TSBs) applicable to the vehicle.

Rather than an on-board analysis within scan tool 62, the data gathered, for example DTC code P0301, is transmitted to host device 12. By looking up DTC code P0301 in database 24*a*, host device 12 (more particularly, processor 22 therein) determines that the vehicle has experienced a misfire in cylinder #1. This information may then be passed to an algorithm 26 structured to assist the user in identifying the root cause of the cylinder 1 misfire.

One potential cause of a misfire is a faulty spark plug or wire. Thus, the first output of host device 12 may be "Misfire, Cylinder #1—Check Spark Plug/Wire." This output is returned to scan tool 62 so that subsequent action may be taken on the vehicle. Host device 12 also makes a record of the input and output, for example in storage 28, so as to facilitate resuming diagnosis at the proper point within algorithm 26.

In response, the user may replace the spark plug and wire in cylinder #1 and test the vehicle a second time. Alternatively, depending upon the output returned by host device 12, the user may utilize an additional tool, such as electrical test tool 64, or another data gathering device 14 relevant to the output returned by host device 12. For purposes of this description, however, it will suffice to describe using only scan tool 62. Should the problem persist, scan tool 62 once again transmits a DTC to host interface 12. Host device 12 moves to the next step in diagnosis algorithm 26—for example, checking for a faulty coil pack. Processor 22 generates and returns an appropriate output, such as "Misfire, Cylinder #1—Check Coil Pack," for subsequent action. The process between scan tool 62 and host device 12 proceeds in similar recursive fashion until the data sent to host device 12 by scan tool 62 indicates that the problem is corrected.

It is further contemplated that, in addition to providing the messages shown above, host device 12 may also return relevant part numbers and inventory levels. That is, the user of scan tool 62, in addition to receiving a message to check the spark plug and wire or the coil pack, may receive a message indicating the specific part number of the replacement part and the stock level of the replacement part. Partially to this end, host device 12 is configured to exchange information with a network 32. Network 32 may be used to push updated part numbers, inventory levels, and the like to host device 12. Network 32 may also be used to push other data, such as updated DTCs, and TSBs, to host device 12, as well as firmware or software updates through host device 12 to scan tool 62, electrical test tool 64, or any other data gathering device 14 in communication therewith. Similarly, host device 12 may push identifying information of vehicles serviced and problems diagnosed to network 32, as well as information concerning replacement parts used (and, therefore, no longer in inventory). As desired, host device 12 may also push output information to one or more output devices 30, such as personal computer 66, printer 68, wireless network interface 70, or modem 72.

Although an example of data management system 10 is illustrated and described in the context of a vehicle service environment, using a single OBD-II DTC, it should be appreciated that data management system 10 may be used in any environment where it is desirable to have centrally managed and processed information provided by remote data gathering devices.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A data management system for gathering vehicle data, the data management system comprising:

a data gathering device; and a host device, the host device being different from the data gathering device, wherein said data gathering device is configured to:

gather a first data item regarding a target object on a vehicle, transmit the first data item to said host device in a first instance, and transmit a second data item to said host device in a second instance, the second instance being after the first instance, and wherein said host device is configured to:

receive the first data item from the data gathering device in the first instance, operate on the first data item to produce a first output by comparing the first data item to a diagnosis algorithm, transmit the first output to said data gathering device, receive a record of an action taken on the vehicle based on the first output, receive the second data item from the data gathering device in the second instance, the second instance being after the transmission of the first output to the data gathering device, determine, in response to reception of the second data item from the data gathering device, that the action taken on the vehicle was ineffective based on a determination that the first and the second data items are the same, operate on the second data item to produce a second output by comparing the second data item to the diagnosis algorithm, the second output being different from the first output, and transmit the second output to the data gathering device.

2. The data management system according to claim 1, wherein said data gathering device generates the first data item or the second data item as a result of testing an aspect of the target object.

3. The data management system according to claim 1, further comprising an output device, and wherein said output device is selected from the group consisting of a printer, a display, a modem, a wireless transmitter, a standalone computer, a networked computer, and a data storage device.

4. The data management system according to claim 1, wherein said data gathering device is further configured to test an aspect of the target object upon receipt of and in response to the first output.

5. The data management system according to claim 1, wherein said host device is in direct communication with said data gathering device.

6. The data management system according to claim 1, wherein said host device communicates wirelessly with said data gathering device.

7. The data management system according to claim 1, wherein said host device is in further communication with a network, and wherein said network and said host device are configured to exchange information.

8. The data management system according to claim 1, wherein said data gathering device is a test device configured to test the vehicle and its components.

9. The data management system according to claim 1, wherein said data gathering device is hand held.

10. A method of collecting and managing data regarding a target object, the method comprising:

gathering a first data item regarding the target object on a vehicle using a test device;

transmitting the first data item from the test device to a host device, the host device being different from the test device;

receiving, from the test device and at the host device, the first data item in a first instance;

comparing the first data item to a diagnosis algorithm by the host device to produce a first output;

transmitting the first output from the host device to the test device;

receiving, from the test device by the host device, a record of an action taken on the vehicle based on the first output;

gathering a second data item regarding the target object on the vehicle using the test device;

transmitting the second data item from the test device to the host device in a second instance, the second instance being after the first instance;

determining, in response to reception of the second data item from the test device, that the action taken on the vehicle was ineffective based on a determination that the first and the second data items are the same;

comparing the second data item to the diagnosis algorithm by the host device to produce a second output, the second output being different from the first output; and transmitting the second output from the host device to the test device.

11. The method according to claim 10, wherein the second data item is gathered in response to receipt of the first output.

12. The method according to claim 10, wherein said transmitting steps involve direct communication between the test device and the host device.

13. The method according to claim 10, wherein said transmitting steps involve wireless communication between the test device and the host device.

14. The method according to claim 10, wherein gathering the first data item regarding the target object comprises:

testing an aspect of the target object using the test device; and generating the first data item in the test device as a result of said testing step.

15. The method according to claim 10, further comprising:

connecting the host device to a network; and exchanging information between the host device and the network.

16. The method according to claim 15, wherein exchanging information between the host device and the network comprises sending a system update to the host device, the method further comprising installing the system update on one or more of the host device and the test device.

17. The system according to claim 1, wherein the data gathering device further comprises a display configured to display the first output or the second output to a user.

18. The method according to claim 10, wherein transmitting the first output or the second output from the host device to the test device further comprises displaying the first output or the second output on a display within the test device to a user.

* * * * *